United States Patent
Bae et al.

(10) Patent No.: US 11,584,849 B2
(45) Date of Patent: Feb. 21, 2023

(54) THERMOPLASTIC RESIN COMPOSITION

(71) Applicant: LG CHEM, LTD., Seoul (KR)

(72) Inventors: Jae Yeon Bae, Daejeon (KR); Ki Young Nam, Daejeon (KR); Je Sun Yoo, Daejeon (KR); Jae Yong Sim, Daejeon (KR); Seon Hyeong Bae, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 314 days.

(21) Appl. No.: 16/768,631

(22) PCT Filed: Jan. 10, 2019

(86) PCT No.: PCT/KR2019/000416
§ 371 (c)(1),
(2) Date: May 29, 2020

(87) PCT Pub. No.: WO2019/139386
PCT Pub. Date: Jul. 18, 2019

(65) Prior Publication Data
US 2021/0171761 A1 Jun. 10, 2021

(30) Foreign Application Priority Data

Jan. 10, 2018 (KR) .......................... 10-2018-0003197
Jan. 9, 2019 (KR) .......................... 10-2019-0002852

(51) Int. Cl.
| | | |
|---|---|---|
| C08L 55/02 | (2006.01) |
| C08G 63/183 | (2006.01) |
| C08G 63/189 | (2006.01) |
| C08G 63/199 | (2006.01) |
| C08G 63/672 | (2006.01) |
| C08K 3/22 | (2006.01) |
| C08K 5/00 | (2006.01) |
| C08L 25/12 | (2006.01) |

(52) U.S. Cl.
CPC ............ *C08L 55/02* (2013.01); *C08G 63/183* (2013.01); *C08G 63/189* (2013.01); *C08G 63/199* (2013.01); *C08G 63/672* (2013.01); *C08K 3/2279* (2013.01); *C08K 5/0066* (2013.01); *C08L 25/12* (2013.01); *C08K 2201/005* (2013.01); *C08L 2205/02* (2013.01); *C08L 2205/035* (2013.01)

(58) Field of Classification Search
CPC ...... C08L 25/12; C08L 55/02; C08L 2205/03; C08L 2205/035; C08L 67/02; C08G 63/181; C08G 63/183; C08G 63/185; C08G 63/187; C08G 63/189; C08G 63/672; C08K 5/0066; C08K 3/2279
See application file for complete search history.

(56) References Cited

U.S. PATENT DOCUMENTS

| | | | |
|---|---|---|---|
| 5,635,565 A | 6/1997 | Miyajima et al. | |
| 8,263,693 B2 | 9/2012 | Seo et al. | |
| 10,189,984 B2 | 1/2019 | Kim et al. | |
| 2009/0170735 A1* | 7/2009 | Park ...................... C08L 67/02 | 525/122 |
| 2010/0210773 A1 | 8/2010 | Seo et al. | |
| 2015/0065637 A1* | 3/2015 | Sugioka ................ B29C 48/022 | 525/64 |
| 2018/0002522 A1* | 1/2018 | Kim ........................ C08L 67/02 | |

FOREIGN PATENT DOCUMENTS

| | | | | |
|---|---|---|---|---|
| CN | 106221151 A | 12/2016 | | |
| EP | 2077299 A1 | 7/2009 | | |
| JP | 06248159 A * | 9/1994 | | |
| KR | 100392314 B1 | 3/2004 | | |
| KR | 100497167 B1 | 6/2005 | | |
| KR | 20090025134 A | 3/2009 | | |
| KR | 20090058785 A * | 6/2009 | ............ C08K 53/02 |
| KR | 20090058785 A | 6/2009 | | |
| KR | 20130067516 A | 6/2013 | | |
| KR | 20150067478 A * | 6/2015 | ................ C08J 5/00 |
| KR | 20170067318 A | 6/2017 | | |
| KR | 20170068726 A | 6/2017 | | |
| WO | WO2019139386 A1 | 1/2019 | | |

OTHER PUBLICATIONS

The MSDS for Keyflex BT 1040D from LG Chem available online at http://www.chemwide.co.kr/prod_Mg/050000/050200/050000_20170615003928_1.pdf (Year: 2017).*
Extended European Search Report for EP19739138.6, dated Mar. 12, 2021.

* cited by examiner

Primary Examiner — Lee E Sanderson

(57) ABSTRACT

A thermoplastic resin composition includes a first copolymer including a conjugated diene-based polymer, a unit derived from an aromatic vinyl-based monomer, and a unit derived from a vinyl cyan-based monomer; a second copolymer including a unit derived from an aromatic vinyl-based monomer and a unit derived from a vinyl cyan-based monomer; and, with respect to 100 parts by weight of the sum of the first copolymer and the second copolymer, 2.0 to 10 parts by weight of a third copolymer having a soft segment including a unit derived from a polyalkylene glycol and a hard segment including unit derived from an aromatic dicarboxylic acid or aromatic dicarboxylate and a unit derived from a linear aliphatic diol; and 2.5 to 10 parts by weight of a fourth copolymer including an aromatic dicarboxylic acid-derived unit, a unit derived from a linear aliphatic diol, and a unit derived from a cyclic aliphatic diol.

15 Claims, No Drawings

THERMOPLASTIC RESIN COMPOSITION

CROSS-REFERENCE TO RELATED APPLICATIONS

The present application is a National Phase entry of International Application No. PCT/KR2019/000416 filed on Jan. 1, 2019, which claims priority to and the benefit of Korean Patent Application No. 10-2018-0003197, filed on Jan. 10, 2018, and Korean Patent Application No. 10-2019-0002852, filed on Jan. 9, 2019, the disclosures of which are incorporated herein by reference in their entirety.

TECHNICAL FIELD

The present invention relates to a thermoplastic resin composition, and more particularly, to a thermoplastic resin composition which is excellent in both of chemical resistance and impact resistance and exhibits excellent dimensional stability in a commercialization process.

BACKGROUND ART

An acrylonitrile/butadiene/styrene graft copolymer has been used for a wide range of applications including electrical and electronic products and office automation equipment due to its excellent mechanical properties and processability. However, the resin itself does not have flame resistance, and thus a flame retardant and a flame retardant aid are added to impart flame resistance to the resin.

However, the addition of a flame retardant and a flame retardant aid causes a significant degradation of mechanical properties and chemical resistance.

In order to solve this problem, the addition of a thermoplastic polyester elastomer as an additive has been proposed. However, since the thermoplastic polyester elastomer is so expensive, production costs of a thermoplastic resin composition are increased, and there is a problem that a total volume is excessively reduced in a commercialization process and thus dimensional stability is degraded.

DISCLOSURE

Technical Problem

The present invention is directed to providing a thermoplastic resin composition which is excellent in both of chemical resistance and impact resistance and exhibits excellent dimensional stability in a commercialization process.

Technical Solution

According to an embodiment of the present invention, there is provided a thermoplastic resin composition which includes a first copolymer including a conjugated diene-based polymer, a unit derived from an aromatic vinyl-based monomer, and a unit derived from a vinyl cyan-based monomer; a second copolymer including a unit derived from an aromatic vinyl-based monomer and a unit derived from a vinyl cyan-based monomer; and, with respect to 100 parts by weight of the sum of the first copolymer and the second copolymer, 2.0 to 10 parts by weight of a third copolymer having a soft segment including a unit derived from a polyalkylene glycol and a hard segment including unit derived from an aromatic dicarboxylic acid or aromatic dicarboxylate and a unit derived from a linear aliphatic diol; and 2.5 to 10 parts by weight of a fourth copolymer including an aromatic dicarboxylic acid-derived unit, a unit derived from a linear aliphatic diol, and a unit derived from a cyclic aliphatic diol.

Advantageous Effects

A thermoplastic resin composition according to the present invention can be excellent in chemical resistance and impact resistance and exhibit excellent dimensional stability in a commercialization process. Also, the thermoplastic resin composition can exhibit excellent flame resistance.

MODE FOR INVENTION

Hereinafter, the present invention will be described in more detail to promote understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, the average particle size of a conjugated diene-based polymer may be defined as a particle size corresponding to the $50^{th}$ percentile or more in the cumulative, volume-based particle size distribution curve.

In the present invention, the average particle size of a conjugated diene-based polymer may be measured using Nicomp Nano equipment (trade name: N3000, manufactured by PSS Nicomp) after diluting a 5% polymer suspension with 60 ml of distilled water and then collecting 5 ml of the diluted suspension therefrom.

In the present invention, the degree of grafting may be calculated by adding a predetermined amount of a graft copolymer as a first copolymer to a solvent, followed by dissolution using a vibrator, centrifugation using a centrifuge, and drying to obtain an insoluble content, and then by using the weight of the insoluble content and the following equation. Specifically, the degree of grafting may be calculated by adding a predetermined amount of a graft copolymer to acetone; dissolving the graft copolymer having been liberated through vibration using a vibrator (trade name: SI-600R, manufactured by Lab. Companion) for 24 hours; centrifuging the resultant substance using a centrifuge at 14,000 rpm for 1 hour; and drying using a vacuum dryer (trade name: DRV320DB, manufactured by Advantec) at 140° C. for 2 hours to obtain an insoluble content, and then by using the weight of the insoluble content and the following equation.

$$\text{Degree of grafting }(\%)=[(Y-(X\times R))/(X\times R)]\times 100$$

Y: Weight of insoluble content

X: Weight of graft copolymer added in the case where insoluble content is obtained R: Fraction of conjugated diene-based polymer in graft copolymer added in the case where insoluble content is obtained In the present invention, the weight average molecular weight of a shell of a first copolymer may refer to a weight average molecular weight of a copolymer including a unit derived from an aromatic vinyl-based monomer and a unit derived from a vinyl cyan-based monomer which is graft polymerized to a conjugated diene-based polymer.

In the present invention, the weight average molecular weight of a shell of a first copolymer may be measured as a relative value with respect to a standard polystyrene (PS) specimen through gel permeation chromatography (GPC) after the insoluble content obtained in the measurement process of the degree of grafting is dissolved at a concentration of 1 wt % in tetrahydrofuran (THF) and then filtered through a 1 μm filter.

In the present invention, a weight average molecular weight may be measured as a relative value with respect to a standard PS specimen using one or more selected from the group consisting of THF, chloroform, and chlorophenol as an elution solvent through GPC (Waters Breeze).

A thermoplastic resin composition according to an embodiment of the present invention includes 1) a first copolymer including a conjugated diene-based polymer, a unit derived from an aromatic vinyl-based monomer, and a unit derived from a vinyl cyan-based monomer; 2) a second copolymer including a unit derived from an aromatic vinyl-based monomer and a unit derived from a vinyl cyan-based monomer; and, with respect to 100 parts by weight of the sum of the first copolymer and the second copolymer, 3) 2.0 to 10 parts by weight of a third copolymer having a soft segment including a unit derived from a polyalkylene glycol and a hard segment including unit derived from an aromatic dicarboxylic acid or an aromatic dicarboxylate and a unit derived from a linear aliphatic diol; and 4) 2.5 to 10 parts by weight of a fourth copolymer including an aromatic dicarboxylic acid-derived unit, a unit derived from a linear aliphatic diol, and a unit derived from a cyclic aliphatic diol.

The thermoplastic resin composition according to an embodiment of the present invention may further include 5) a flame retardant and 6) a flame retardant aid.

Hereinafter, each component of the thermoplastic resin composition according to an embodiment of the present invention will be described in detail.

1. First Copolymer

The first copolymer is a graft copolymer and includes a conjugated diene-based polymer, a unit derived from an aromatic vinyl-based monomer, and a unit derived from a vinyl cyan-based monomer.

The first copolymer may impart excellent chemical resistance, impact resistance, thermal stability, colorability, fatigue resistance, rigidity, and processability to the thermoplastic resin composition.

The conjugated diene-based polymer may include a modified conjugated diene-based polymer prepared by graft polymerization of a conjugated diene-based polymer, which was prepared by polymerizing a conjugated diene-based monomer, with an aromatic vinyl-based monomer and a vinyl cyan-based monomer.

The conjugated diene-based monomer may be one or more selected from the group consisting of 1,3-butadiene, isoprene, chloroprene, and piperylene, and, in particular, 1,3-butadiene is preferred.

The conjugated diene-based polymer may be a conjugated diene-based rubber polymer.

The conjugated diene-based polymer may be included in an amount of 45 to 75 wt %, 50 to 70 wt % or 55 to 65 wt % with respect to the total weight of the first copolymer, and is preferably included in an amount of 55 to 65 wt %. When the content of the conjugated diene-based polymer falls within the above range, impact resistance and processability of the first copolymer may be further improved.

The conjugated diene-based polymer may have an average particle size of 0.20 to 0.5 μm, 0.25 to 0.4 μm, or 0.30 to 0.35 μm, and preferably has an average particle size of 0.30 to 0.35 μm. When the average particle size of the conjugated diene-based polymer falls within the above range, mechanical properties of the first copolymer may be further improved.

The unit derived from an aromatic vinyl-based monomer may be a unit derived from one or more selected from the group consisting of styrene, α-methylstyrene, α-ethylstyrene, and p-methylstyrene, and, in particular, a styrene-derived unit is preferred.

The unit derived from an aromatic vinyl-based monomer may be included in an amount of 15 to 45 wt %, 20 to 40 wt %, or 25 to 35 wt % with respect to the total weight of the first copolymer, and is preferably included in an amount of 25 to 35 wt %. When the content of the unit derived from an aromatic vinyl-based monomer falls within the above range, chemical resistance, rigidity, impact resistance, processability, and surface gloss of the thermoplastic resin composition may be further improved.

The unit derived from a vinyl cyan-based monomer may be a unit derived from one or more selected from the group consisting of acrylonitrile, methacrylonitrile, phenylacrylonitrile, and α-chloroacrylonitrile, and, in particular, an acrylonitrile-derived unit is preferred.

The unit derived from a vinyl cyan-based monomer may be included in an amount of 1 to 20 wt %, 3 to 17 wt %, or 5 to 12 wt % with respect to the total weight of the first copolymer, and is preferably included in an amount of 5 to 12 wt %. When the content of the unit derived from a vinyl cyan-based monomer falls within the above range, chemical resistance, rigidity, impact resistance, processability, and surface gloss of the thermoplastic resin composition may be further improved.

The degree of grafting for the first copolymer may be 10 to 60%, 20 to 50%, or 30 to 40%, and is preferably 30 to 40%. When the degree of grafting for the first copolymer falls within the above range, thermal stability and mechanical properties of the first copolymer are harmoniously realized.

A shell of the first copolymer may have a weight average molecular weight of 10,000 to 150,000 g/mol, 30,000 to 120,000 g/mol, or 50,000 to 100,000 g/mol, and preferably has a weight average molecular weight of 50,000 to 100,000 g/mol. When the weight average molecular weight of a shell of the first copolymer falls within the above range, a polymerization reaction is easily controlled, and mechanical properties and processability are harmoniously realized.

The shell of the first copolymer may include a unit derived from an aromatic vinyl-based monomer and a unit derived from a vinyl cyan-based monomer which are graft polymerized with a conjugated diene-based polymer.

The first copolymer is preferably an acrylonitrile/butadiene/styrene graft copolymer.

The first copolymer may be prepared by polymerization of the aromatic vinyl-based monomer and the vinyl cyan-based monomer in the presence of the conjugated diene-based polymer through one or more methods selected from the group consisting of emulsion polymerization, suspension polymerization, and bulk polymerization, and, in particular, emulsion polymerization is preferably used.

2. Second Copolymer

The second copolymer includes a unit derived from an aromatic vinyl-based monomer and a unit derived from a vinyl cyan-based monomer.

The second copolymer may harmoniously impart properties, that is, mechanical properties, fluidity, and heat resistance to the thermoplastic resin composition.

The unit derived from an aromatic vinyl-based monomer may be a unit derived from one or more selected from the group consisting of styrene, α-methylstyrene, α-ethylstyrene, and p-methylstyrene, and, in particular, a styrene-derived unit is preferred.

The unit derived from a vinyl cyan-based monomer may be a unit derived from one or more selected from the group consisting of acrylonitrile, methacrylonitrile, phenylacrylonitrile, and α-chloroacrylonitrile, and, in particular, an acrylonitrile-derived unit is preferred.

The second copolymer may include the unit derived from an aromatic vinyl-based monomer and the unit derived from a vinyl cyan-based monomer in a weight ratio of 85:15 to 60:40, 80:20 to 65:35, or 75:25 to 70:30, preferably in a weight ratio of 65:35 or 75:25 to 70:30. When the weight ratio of the unit derived from the aromatic vinyl-based monomer and the unit derived from the vinyl cyan-based monomer falls within the above range, properties, that is, mechanical properties, fluidity, and heat resistance, may be harmoniously imparted to the thermoplastic resin composition.

The second copolymer may have a weight average molecular weight of 100,000 to 180,000 g/mol, 120,000 to 160,000 g/mol, or 130,000 to 150,000 g/mol, and preferably has a weight average molecular weight of 130,000 to 150,000 g/mol. When the weight average molecular weight of the second copolymer falls within the above range, a polymerization reaction is easily controlled, and mechanical properties and processability are harmoniously realized.

The second copolymer may be one or more selected from the group consisting of a styrene/acrylonitrile copolymer and an α-methylstyrene/acrylonitrile copolymer, and, in particular, a styrene/acrylonitrile copolymer is preferred.

The second copolymer may be prepared by polymerization of the aromatic vinyl-based monomer and the vinyl cyan-based monomer through one or more methods selected from the group consisting of emulsion polymerization, suspension polymerization, and bulk polymerization, and, in particular, bulk polymerization is preferably used.

A weight ratio of the first copolymer and the second copolymer may be 15:85 to 45:55, 20:40 to 40:60, or 25:75 to 35:65, and is preferably 25:75 to 35:70. When the weight ratio falls within the above range, excellent mechanical strength, chemical resistance, processability, thermal stability, and impact resistance are exhibited.

3. Third Copolymer

The third copolymer has a soft segment including a unit derived from a polyalkylene glycol and a hard segment including a unit derived from an aromatic dicarboxylic acid or aromatic dicarboxylate and a unit derived from a linear aliphatic diol.

The third copolymer may be a thermoplastic polyester elastomer. The third copolymer has excellent compatibility with the first copolymer, and it may improve impact resistance and chemical resistance of the thermoplastic resin composition, and minimize a degradation of flame resistance.

The unit derived from the polyalkylene glycol may be a unit derived from one or more selected from the group consisting of polyethylene glycol, polypropylene glycol, poly(1,2-butylene glycol), polypentylene glycol, polyhexylene glycol, polyheptylene glycol, polyoctylene glycol, polynonylene glycol, polydecylene glycol, and α-hydro-omega-hydroxypoly(oxy-1,4-butanediyl). In particular, a unit derived from one or more selected from the group consisting of polypropylene glycol and α-hydro-omega-hydroxypoly(oxy-1,4-butanediyl) is preferred, and a unit derived from α-hydro-omega-hydroxypoly(oxy-1,4-butanediyl) is more preferred.

The unit derived from the aromatic dicarboxylic acid may be a unit derived from one or more selected from the group consisting of 1,4-benzene dicarboxylic acid, isophthalic acid, 2,6-naphthalene dicarboxylic acid, and 1,5-naphthalene dicarboxylic acid, and, in particular, a unit derived from 1,4-benzene dicarboxylic acid is preferred.

The unit derived from the aromatic dicarboxylate may be a unit derived from one or more selected from the group consisting of dimethyl terephthalate, dimethyl isophthalate, and dimethyl 2,6-naphthalene dicarboxylate, and, in particular, a unit derived from dimethyl terephthalate is preferred.

The unit derived from the linear aliphatic diol may be a unit derived from one or more selected from the group consisting of 1,2-ethanediol, 1,3-propanediol, 1,4-butanediol, 1,5-pentanediol, and 1,6-hexanediol, and, in particular, a unit derived from 1,4-butanediol is preferred.

The hard segment may include unit derived from an aromatic dicarboxylic acid or the aromatic dicarboxylate and a unit derived from a linear aliphatic diol in a weight ratio of 50:50 to 75:25 or 50:50 to 65:35, preferably in a weight ratio of 50:50 to 65:35. When the weight ratio of the unit derived from an aromatic dicarboxylic acid or the aromatic dicarboxylate and the unit derived from the linear aliphatic diol falls within the above range, impact resistance, mechanical strength, heat resistance, chemical resistance, and processability are further improved.

The third copolymer may include the soft segment and the hard segment in a weight ratio of 50:50 to 30:70 or 50:50 to 35:65, preferably in a weight ratio of 50:50 to 35:65. When the weight ratio of the soft segment and the hard segment falls within the above range, impact resistance, processability, chemical resistance, and flame resistance of the third copolymer are further improved.

The third copolymer may have a weight average molecular weight of 50,000 to 200,000 g/mol or 100,000 to 150,000 g/mol, and preferably has a weight average molecular weight of 100,000 to 150,000 g/mol. When the weight average molecular weight of the third copolymer falls within the above range, impact resistance and processability may be further improved.

The third copolymer may have a melt flow index (230° C., 2.16 kg) of 0.1 to 30 g/10 min, 0.5 to 25 g/10 min, or 3 to 10 g/10 min, as measured in accordance with ASTM D1238, and preferably has a melt flow index of 3 to 10 g/10 min. When the melt flow index of the third copolymer falls within the above range, heat resistance, elongation, tensile strength, and processability of the third copolymer may be further improved The third copolymer may be prepared by melt polycondensation of polyester, which is prepared by esterification of an aromatic dicarboxylic acid with a linear aliphatic diol or transesterification of an aromatic dicarboxylate with a linear aliphatic diol, with polyalkylene glycol. In this case, the hard segment may include a unit derived from a polyester, and the soft segment may include the unit derived from the polyalkylene glycol.

The third copolymer may be one or more selected from the group consisting of 1,4-benzenedicarboxylic acid, polymer with 1,4-butanediol and α-hydro-omega-hydroxypoly(oxy-1,4-butanediyl) (CAS No. 37282-12-5) and 1,4-benzenedicarboxylic acid, dimethyl ester, polymer with 1,4-butanediol and α-hydro-omega-hydroxypoly(oxy-1,4-butanediyl) (CAS No. 9078-71-1).

The third copolymer may be directly prepared by the above-described method or may be a commercially available copolymer. For example, PBT KEYFLEX BT2140D manufactured by LG Chem Ltd. (trade name; CAS No. 9078-71-1) or KEYFLEX BT2140D manufactured by LG Chem Ltd. (trade name; CAS No. 37282-12-5) may be used.

The third copolymer is included in an amount of 2.0 to 10 parts by weight, preferably 2.5 to 7 parts by weight, and more preferably 5 to 7 parts by weight with respect to 100 parts by weight of the sum of the first copolymer and the second copolymer. When the content of the third copolymer is less than the above range, overall properties of the thermoplastic resin composition are degraded, and excellent chemical resistance may not be imparted. When the content of the third copolymer is greater than the above range, production costs may increase without additional improvement. Also, the percentage of moisture content in the thermoplastic resin composition is increased due to the third copolymer, and thus it is difficult to process the thermoplastic resin composition, and heat shrinkage also increases in a commercialization process, and thus dimensional stability is significantly degraded.

4. Fourth Copolymer

The fourth copolymer includes an aromatic dicarboxylic acid-derived unit, a unit derived from a linear aliphatic diol, and a unit derived from a cyclic aliphatic diol.

The fourth copolymer is modified polyester, and may harmoniously impart chemical resistance and impact resistance while imparting excellent chemical resistance to the thermoplastic resin composition. In addition, the fourth copolymer may impart excellent extrusion moldability and blow moldability to the thermoplastic resin composition. Additionally, the fourth copolymer may impart excellent dimensional stability in a commercialization process of the thermoplastic resin composition. Also, since the fourth copolymer may assist the third copolymer, a usage amount of the expensive third copolymer may be reduced, and thus production costs of the thermoplastic resin composition may be reduced.

The unit derived from the aromatic dicarboxylic acid may be a unit derived from one or more selected from the group consisting of 1,4-benzene dicarboxylic acid, isophthalic acid, 2,6-naphthalene dicarboxylic acid, and 1,5-naphthalene dicarboxylic acid, and, in particular, a unit derived from 1,4-benzene dicarboxylic acid is preferred.

The unit derived from the aromatic dicarboxylic acid may be included in an amount of 10 to 70 wt % or 45 to 65 wt % with respect to the total weight of the fourth copolymer, and is preferably included in an amount of 45 to 65 wt %. When the content of the unit derived from the aromatic dicarboxylic acid falls within the above range, heat resistance, mechanical properties, and processability are harmoniously realized.

The unit derived from the linear aliphatic diol may be a unit derived from one or more selected from the group consisting of 1,2-ethanediol, 1,3-propanediol, 1,4-butanediol, 1,5-pentanediol, and 1,6-hexanediol, and, in particular, a unit derived from 1,2-ethanediol is preferred.

The unit derived from the linear aliphatic diol may be included in an amount of 1 to 50 wt % or 3 to 30 wt % with respect to the total weight of the fourth copolymer, and is preferably included in an amount of 3 to 30 wt %. When the content of the unit derived from the linear aliphatic diol falls within the above range, chemical resistance, impact resistance, mechanical properties, and processability are harmoniously realized.

The unit derived from the cyclic aliphatic diol may be a unit derived from one or more selected from the group consisting of 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 2,2,4,4-tetramethyl-1,3-cyclobutanediol, and, in particular, a unit derived from 1,4-cyclohexanedimethanol is preferred.

The unit derived from the cyclic aliphatic diol may be included in an amount of 20 to 50 wt % or 25 to 45 wt % with respect to the total weight of the fourth copolymer, and is preferably included in an amount of 25 to 45 wt %. When the content of the unit derived from the cyclic aliphatic diol falls within the above range, excellent transparency, chemical resistance, and processability are exhibited.

The fourth copolymer may have a weight average molecular weight of 50,000 to 400,000 g/mol or 60,000 to 300,000 g/mol, and preferably has a weight average molecular weight of 60,000 to 300,000 g/mol. When the weight average molecular weight of the fourth copolymer falls within the above range, chemical resistance, heat resistance, processability, and mechanical properties are harmoniously realized.

The fourth copolymer is preferably 1,4-benzenedicarboxylic acid, polymer with 1,4-cyclohexanedimethanol and 1,2-ethanediol (CAS No. 25038-91-9).

The fourth copolymer may be directly prepared or may be a commercially available copolymer. For example, JN100 (trade name) manufactured by SK Chemicals may be used.

The fourth copolymer may be included in an amount of 2.5 to 10 parts by weight, preferably, 2.5 to 7 parts by weight with respect to 100 parts by weight of the sum of the first copolymer and the second copolymer. When the content of the fourth copolymer is less than the above range, impact resistance and chemical resistance may be degraded, and when the content of the fourth copolymer is greater than the above range, flame resistance may be degraded.

5. Flame Retardant

The flame retardant may be included to impart flame resistance to the thermoplastic resin composition.

The flame retardant may be a halogen-based flame retardant, and, in particular, a bromine-based flame retardant is preferably used. When a bromine-based flame retardant is used, an excellent flame retardant effect may be realized when the thermoplastic resin composition is manufactured into a thin film.

The bromine-based flame retardant may be one or more selected from the group consisting of tetrabromobisphenol A, decabromodiphenyl oxide, decabrominated diphenyl ethane, 1,2-bis(2,4,6-tribromophenyl) ethane, octabromo-1,3,3-trimethyl-1-phenylindane, tetrabromobisphenol A-bis(2,3-dibromopropyl ether), and 2,4,6-tris(2,4,6-tribromophenoxy)-1,3,5-triazine, and, in particular, 2,4,6-tris(2,4,6-tribromophenoxy)-1,3,5-triazine is preferred.

The flame retardant may be included in an amount of 10 to 30 parts by weight or 15 to 25 parts by weight with respect to 100 parts by weight of the sum of the first copolymer and the second copolymer, and is preferably included in an amount of 15 to 25 parts by weight. When the content of the flame retardant falls within the above range, excellent flame resistance may be realized even when the thermoplastic resin composition is processed into a thin film, and more excellent fluidity may be imparted to the thermoplastic resin composition.

6. Flame Retardant Aid

The flame retardant aid may assist the flame retardant in such a way that the thermoplastic resin composition attains excellent flame resistance even when a small amount of the flame retardant is included in the thermoplastic resin composition.

The flame retardant aid is preferably antimony trioxide.

The flame retardant aid may be included in an amount of 1 to 15 parts by weight or 3 to 8 parts by weight with respect to 100 parts by weight of the sum of the first copolymer and the second copolymer, and is preferably included in an amount of 3 to 8 parts by weight. When the content of the flame retardant aid falls within the above range, excellent flame resistance may be realized without degrading other properties of the thermoplastic resin composition.

The thermoplastic resin composition according to an embodiment of the present invention may further include an additive, and the additive may be one or more selected from the group consisting of an impact modifier, a thermal stabilizer, an anti-dripping agent, an antioxidant, a photostabilizer, an UV blocker, a pigment, and an inorganic filler.

BEST MODE

Hereinafter, the present invention will be described in detail with reference to embodiments so that those skilled in the art can easily carry out the present invention. However, the present invention may be implemented in several different forms, and therefore, is not limited to embodiments described herein.

Examples and Comparative Examples

The specifications of components used in Examples and Comparative Examples below are as follows.

(A) First copolymer: DP270M manufactured by LG Chem Ltd. (an acrylonitrile/butadiene/styrene graft copolymer prepared by graft copolymerization of a butadiene rubber polymer having an average particle size of 0.3 μm with styrene and acrylonitrile) was used.

(B) Second copolymer: 90HR manufactured by LG Chem Ltd. (a styrene/acrylonitrile copolymer) was used.

(C) Third copolymer: PBT KEYFLEX BT2140D manufactured by LG Chem Ltd. (1,4-benzenedicarboxylic acid, dimethyl ester, polymer with 1,4-butanediol and α-hydro-omega-hydroxypoly(oxy-1,4-butanediyl) (CAS No. 9078-71-1)) was used.

(D) Fourth copolymer: JN100 manufactured by SK Chemicals (1,4-benzenedicarboxylic acid, polymer with 1,4-cyclohexanedimethanol and 1,2-ethanediol (CAS No. 25038-91-9)) was used.

(E) Flame retardant: SR245 manufactured by Woojin Copolymer Co., Ltd. (2,4,6-tris(2,4,6-tribromophenoxy)-1,3,5-triazine) was used.

(F) Flame retardant aid: Antimony trioxide was used.

The components (A) to (F) were put into a Henschel mixer in contents as listed in Table 1 and Table 2 below and homogeneously mixed to prepare a thermoplastic resin composition.

Experimental Example

Each of the thermoplastic resin compositions according to Examples and Comparative Examples was put into a twin screw extruder set to 230° C. and extruded to prepare a pellet. The pellet was injected to prepare a specimen, and properties of the specimen were evaluated by methods as described below, and results thereof are shown in Table 1 and Table 2 below.

(1) ESCR: A specimen having a size of 3.2 mm×12.7 mm×200 mm, which was prepared by the above injection, was fixed to a jig with a curvature of 1.5, glacial acetic acid (acetic acid: 99.5 wt %) was applied thereon, and then whether or not the specimen is cut or broken was observed for 10 minutes. A case where the specimen was not cut or broken within 10 minutes of time was denoted as "PASS", and a case where the specimen was cut or broken was denoted as "FAIL".

(2) Impact strength (kg·cm/cm, ¼ inch): measured in accordance with ASTM D256. In this case, an impact strength of 30 kg·cm/cm or more indicates excellent impact resistance.

(3) Flame resistance: evaluated by the UL-94 vertical burning test using the specimen (thickness: 1/12 inch).

(4) Shrinkage (%): measured in a machine direction (MD) using a 2 mm-thick specimen with VMA-4540 equipment (commercially available from Nikon Corporation) in accordance with ISO 294-4/ASTM D955, and measured 24 hours after specimen injection. In this case, a shrinkage of 0.45 to 0.65% indicates excellent dimensional stability.

TABLE 1

| Classification | Examples | | | | |
|---|---|---|---|---|---|
| | 1 | 2 | 3 | 4 | 5 |
| (A) First copolymer (parts by weight) | 30 | 30 | 30 | 30 | 30 |
| (B) Second copolymer (parts by weight) | 70 | 70 | 70 | 70 | 70 |
| (C) Third copolymer (parts by weight) | 7 | 5 | 7 | 5 | 2.5 |
| (D) Fourth copolymer (parts by weight) | 2.5 | 5 | 5 | 7 | 10 |
| (E) Flame retardant (parts by weight) | 20 | 20 | 20 | 20 | 20 |
| (G) Flame retardant aid (parts by weight) | 4 | 4 | 4 | 4 | 4 |
| ESCR | PASS | PASS | PASS | PASS | PASS |
| Impact strength | 40 | 38 | 45 | 40 | 34 |
| Flame resistance | V-0 | V-0 | V-0 | V-0 | V-0 |
| Shrinkage | 0.57 | 0.55 | 0.59 | 0.54 | 0.52 |

TABLE 2

| Classification | Comparative Examples | | | | | |
|---|---|---|---|---|---|---|
| | 1 | 2 | 3 | 4 | 5 | 6 |
| (A) First copolymer (parts by weight) | 30 | 30 | 30 | 30 | 30 | 30 |
| (B) Second copolymer (parts by weight) | 70 | 70 | 70 | 70 | 70 | 70 |
| (C) Third copolymer (parts by weight) | — | — | 10 | 20 | 5 | 1.5 |
| (D) Fourth copolymer (parts by weight) | — | 10 | — | — | 1.5 | 7 |
| (E) Flame retardant (parts by weight) | 20 | 20 | 20 | 20 | 20 | 20 |

TABLE 2-continued

| | Comparative Examples | | | | | |
|---|---|---|---|---|---|---|
| Classification | 1 | 2 | 3 | 4 | 5 | 6 |
| (G) Flame retardant aid (parts by weight) | 4 | 4 | 4 | 4 | 4 | 4 |
| ESCR | FAIL | FAIL | PASS | PASS | FAIL | FAIL |
| Impact strength | 20 | 30 | 45 | 50 | 30 | 28 |
| Flame resistance | V-0 | V-0 | V-0 | FAIL | V-0 | V-0 |
| Shrinkage | 0.49 | 0.49 | 0.70 | 1.0 | 0.59 | 0.51 |

Referring to Table 1 and Table 2, it can be confirmed that Examples 1 to 5 were excellent in all of chemical resistance, impact resistance, flame resistance, and dimensional stability. On the other hand, it can be confirmed that Comparative Example 1, in which a third copolymer and a fourth copolymer were not included, exhibited poor chemical resistance and impact resistance. Also, it can be confirmed that Comparative Example 2, in which a third copolymer was not included, exhibited degraded chemical resistance, and Comparative Examples 3 and 4, in which a fourth copolymer was not included, exhibited excessively increased shrinkage, and thus dimensional stability was degraded. In particular, it can be confirmed that Comparative Example 4 exhibited degraded flame resistance because an excessive amount of a third copolymer was included so that a ratio of the flame retardant in the thermoplastic resin composition was decreased.

Meanwhile, Comparative Examples 5 and 6, in which both third and fourth copolymers were included, but not in amounts falling within the ranges presented in the present invention, exhibited poor chemical resistance and impact resistance.

The invention claimed is:

1. A thermoplastic resin composition comprising:
a first copolymer including a conjugated diene-based polymer, a unit derived from an aromatic vinyl-based monomer, and a unit derived from a vinyl cyan-based monomer;
a second copolymer including a unit derived from an aromatic vinyl-based monomer and a unit derived from a vinyl cyan-based monomer;
with respect to 100 parts by weight of sum of the first copolymer and the second copolymer, 2.0 to 10 parts by weight of a third copolymer having a soft segment including a unit derived from a polyalkylene glycol and a hard segment including a unit derived from an aromatic dicarboxylic acid or aromatic dicarboxylate and a unit derived from a linear aliphatic diol; and
2.5 to 10 parts by weight of a fourth copolymer including an aromatic dicarboxylic acid-derived unit, a unit derived from a linear aliphatic diol, and a unit derived from a cyclic aliphatic diol,
wherein the second copolymer has a weight average molecular weight of 120,000 to 180,000 g/mol.

2. The thermoplastic resin composition of claim 1, wherein the conjugated diene-based polymer has an average particle size of 0.2 to 0.5 μm.

3. The thermoplastic resin composition of claim 1, wherein the first copolymer is an acrylonitrile/butadiene/styrene graft copolymer.

4. The thermoplastic resin composition of claim 1, wherein the second copolymer is one or more selected from the group consisting of a styrene/acrylonitrile copolymer and an α-methylstyrene/acrylonitrile copolymer.

5. The thermoplastic resin composition of claim 1, wherein the third copolymer is included in an amount of 2.5 to 7 parts by weight with respect to 100 parts by weight of the sum of the first copolymer and the second copolymer.

6. The thermoplastic resin composition of claim 1, wherein the unit derived from the polyalkylene glycol of the third copolymer is a unit derived from one or more selected from the group consisting of polyethylene glycol, polypropylene glycol, poly(1, 2-butylene glycol), polypentylene glycol, polyhexylene glycol, polyheptylene glycol, polyoctylene glycol, polynonylene glycol, polydecylene glycol, and α-hydro-omega-hydroxypoly(oxy-1, 4-butanediyl),
the unit derived from the aromatic dicarboxylic acid or aromatic dicarboxylate is a unit derived from one or more selected from the group consisting of 1,4-benzene dicarboxylic acid, isophthalic acid, 2,6-naphthalene dicarboxylic acid, 1,5-naphthalene dicarboxylic acid, dimethyl terephthalate, dimethyl isophthalate, and dimethyl 2,6-naphthalene dicarboxylate, and
the unit derived from the unit derived from the linear aliphatic diol is a unit derived from one or more selected from the group consisting of 1,2-ethanediol, 1,3-propanediol, 1,4-butanediol, 1,5-pentanediol, and 1,6-hexanediol.

7. The thermoplastic resin composition of claim 1, wherein the fourth copolymer is included in an amount of 2.5 to 7 parts by weight with respect to 100 parts by weight of the sum of the first copolymer and the second copolymer.

8. The thermoplastic resin composition of claim 1, wherein the unit derived from the aromatic dicarboxylic acid of the fourth copolymer is a unit derived from one or more selected from the group consisting of 1,4-benzene dicarboxylic acid, isophthalic acid, 2,6-naphthalene dicarboxylic acid, and 1,5-naphthalene dicarboxylic acid,
the unit derived from the linear aliphatic diol is a unit derived from one or more selected from the group consisting of 1,2-ethanediol, 1,3-propanediol, 1,4-butanediol, 1,5-pentanediol, and 1,6-hexanediol, and
the unit derived from the cyclic aliphatic diol is a unit derived from one or more selected from the group consisting of 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 2,2,4,4-tetramethyl-1,3-cyclobutanediol.

9. The thermoplastic resin composition of claim 1, further comprising a flame retardant and a flame retardant aid.

10. The thermoplastic resin composition of claim 9, wherein the flame retardant is included in an amount of 10 to 30 parts by weight with respect to 100 parts by weight of the sum of the first copolymer and the second copolymer.

11. The thermoplastic resin composition of claim 9, wherein the flame retardant is one or more selected from the group consisting of tetrabromobisphenol A, decabromodiphenyl oxide, decabrominated diphenyl ethane, 1,2-bis(2,4, 6-tribromophenyl) ethane, octabromo-1,3,3-trimethyl-1-phenylindane, tetrabromobisphenol A-bis(2, 3-dibromopropyl ether), and 2,4,6-tris(2,4,6-tribromophenoxy)-1,3,5-triazine.

12. The thermoplastic resin composition of claim 9, wherein the flame retardant aid is included in an amount of 1 to 15 parts by weight with respect to 100 parts by weight of the sum of the first copolymer and the second copolymer.

13. The thermoplastic resin composition of claim 9, wherein the flame retardant aid is antimony trioxide.

14. The thermoplastic resin composition of claim 1, wherein the thermoplastic resin composition has a flame resistance of at least V-0 according to UL-94.

15. The thermoplastic resin composition of claim 1, wherein a 2 mm-thick specimen of the thermoplastic resin composition has a shrinkage of 0.45-0.65% in a machine direction according to ASTM D955.

\* \* \* \* \*